(12) United States Patent
Choi (10) Patent No.: US 9,908,496 B2
(45) Date of Patent: Mar. 6, 2018

(54) FRONT AIRBAG FOR VEHICLE AND METHOD OF CONTROLLING THE SAME

(71) Applicants: Hyundai Motor Company, Seoul (KR); Kia Motors Corporation, Seoul (KR)

(72) Inventor: Jae Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/254,336

(22) Filed: Sep. 1, 2016

(65) Prior Publication Data
US 2017/0282827 A1    Oct. 5, 2017

(30) Foreign Application Priority Data
Apr. 4, 2016    (KR) .......................... 10-2016-0040878

(51) Int. Cl.
| B60R 21/0136 | (2006.01) |
| B60R 21/26 | (2011.01) |
| B60R 21/205 | (2011.01) |
| B60R 21/261 | (2011.01) |
| B60R 21/00 | (2006.01) |
| B60R 21/01 | (2006.01) |

(52) U.S. Cl.
CPC ........ B60R 21/0136 (2013.01); B60R 21/205 (2013.01); B60R 21/26 (2013.01); *B60R 2021/0004* (2013.01); *B60R 2021/0009* (2013.01); *B60R 2021/01013* (2013.01); *B60R 2021/01211* (2013.01); *B60R 2021/2612* (2013.01); *B60R 2021/26094* (2013.01)

(58) Field of Classification Search
CPC .......... B60R 21/26; B60R 2021/01231; B60R 2021/01238; B60R 2021/26094; B60R 2021/0009; B60R 2021/161; B60R 2021/23324; B60R 2021/0004; B60R 2021/2612; B60R 2021/2615; B60R 21/0136; B60R 2021/23107; B60R 21/205; B60R 2021/01211

See application file for complete search history.

(56) References Cited

U.S. PATENT DOCUMENTS

| 3,642,303 A | * | 2/1972 | Irish | ..................... B60R 21/233 |
| | | | | 280/730.1 |
| 4,136,894 A | * | 1/1979 | Ono | ....................... B60R 21/26 |
| | | | | 102/443 |

(Continued)

FOREIGN PATENT DOCUMENTS

| JP | 2006-256508 A | 9/2006 |
| JP | 2007-161201 A | 6/2007 |

(Continued)

*Primary Examiner* — Barry Gooden, Jr.
(74) *Attorney, Agent, or Firm* — Mintz Levin Cohn Ferris Glovsky and Popeo, P.C.; Peter F. Corless (57) ABSTRACT

A front air bag for a vehicle is provided. The air bag includes an air bag cushion that has of a plurality of chambers and a gas flow passage that supplies each of the chambers with gas of an inflator. A variable valve selectively closes or opens the gas flow passage. Additionally, a controller determines a type of vehicle collision and operates the variable valve based on the collision type.

9 Claims, 5 Drawing Sheets

(56) References Cited

U.S. PATENT DOCUMENTS

| | | | | |
|---|---|---|---|---|
| 4,262,931 A * | 4/1981 | Strasser | B60R 21/233 | 280/729 |
| 4,765,569 A * | 8/1988 | Higgins | B60R 21/16 | 244/118.5 |
| 5,505,485 A * | 4/1996 | Breed | B32B 3/266 | 280/729 |
| 5,575,497 A * | 11/1996 | Suyama | B60R 21/231 | 280/730.1 |
| 5,820,162 A | 10/1998 | Fink | | |
| 5,934,701 A * | 8/1999 | Furukawa | B60R 21/231 | 280/729 |
| 6,068,288 A * | 5/2000 | Karolek | B60R 21/26 | 280/735 |
| 6,209,908 B1 * | 4/2001 | Zumpano | B60N 2/286 | 280/729 |
| 6,315,323 B1 * | 11/2001 | Pack, Jr. | B60R 21/233 | 280/735 |
| 6,431,586 B1 * | 8/2002 | Eyrainer | B60R 21/213 | 280/730.1 |
| 6,702,320 B1 * | 3/2004 | Lang | B60R 21/2646 | 280/729 |
| 7,316,416 B2 * | 1/2008 | Hasebe | B60R 21/231 | 280/729 |
| 9,150,186 B1 * | 10/2015 | Belwafa | B60R 21/233 | |
| 9,162,645 B2 * | 10/2015 | Cho | B60R 21/205 | |
| 9,623,831 B1 * | 4/2017 | Deng | B60R 21/239 | |
| 2002/0030354 A1 * | 3/2002 | Specht | B60R 21/26 | 280/741 |
| 2003/0116945 A1 * | 6/2003 | Abe | B60R 21/231 | 280/729 |
| 2003/0155750 A1 * | 8/2003 | Hu | B60R 19/205 | 280/730.1 |
| 2004/0169359 A1 * | 9/2004 | Isakov | B60R 21/26 | 280/736 |
| 2005/0189752 A1 * | 9/2005 | Itoga | B60R 21/231 | 280/741 |
| 2006/0290117 A1 * | 12/2006 | Fischer | B60R 21/2338 | 280/739 |
| 2009/0224518 A1 * | 9/2009 | Lim | B60R 21/26 | 280/728.3 |
| 2011/0278826 A1 * | 11/2011 | Fukawatase | B60R 21/231 | 280/730.2 |
| 2013/0020788 A1 * | 1/2013 | Spahn | B60R 21/23 | 280/730.1 |
| 2014/0042733 A1 * | 2/2014 | Fukawatase | B60R 21/231 | 280/730.2 |
| 2015/0115580 A1 * | 4/2015 | Gould | B60R 21/2176 | 280/730.1 |
| 2015/0175116 A1 * | 6/2015 | Cho | B60R 21/205 | 280/729 |
| 2015/0258958 A1 * | 9/2015 | Belwafa | B60R 21/233 | 280/729 |
| 2015/0298643 A1 | 10/2015 | Schneider et al. | | |
| 2016/0046254 A1 * | 2/2016 | Yamada | B60R 21/233 | 280/729 |
| 2016/0144820 A1 * | 5/2016 | Shin | B60R 21/239 | 280/735 |
| 2016/0325641 A1 * | 11/2016 | Ohno | B60N 2/0276 | |
| 2017/0015266 A1 * | 1/2017 | El-Jawahri | B60R 21/01512 | |
| 2017/0021794 A1 * | 1/2017 | Sumiya | B60R 21/233 | |
| 2017/0057453 A1 * | 3/2017 | Morris | B60R 21/233 | |
| 2017/0088086 A1 * | 3/2017 | El-Jawahri | B60R 21/233 | |
| 2017/0096118 A1 * | 4/2017 | Kruse | B60R 21/2338 | |
| 2017/0158154 A1 * | 6/2017 | Kobayashi | B60R 21/01332 | |
| 2017/0232919 A1 * | 8/2017 | Miyata | B60R 21/0136 | 701/45 |

FOREIGN PATENT DOCUMENTS

| | | |
|---|---|---|
| JP | 2011-098697 A | 5/2011 |
| KR | 2008-0007805 A | 1/2008 |
| KR | 2012-0122744 A | 11/2012 |
| KR | 10-2016-0009967 A | 1/2016 |

* cited by examiner

FIG. 5 ered from the outside in the event of vehicle collision. However, conventional air bags have problems in that in the event of oblique collision of vehicles (e.g., side impact), occupants may not be sufficiently protected by the conventional air bags.
FRONT AIRBAG FOR VEHICLE AND METHOD OF CONTROLLING THE SAME

CROSS REFERENCE TO RELATED APPLICATION

The present application claims priority of Korean Patent Application No. 10-2016-0040878, filed on Apr. 4, 2016, the entire contents of which is incorporated herein for all purposes by this reference.

BACKGROUND

Field of the Invention

The present invention relates to an air bag disposed in front of occupants within a vehicle, and more particularly, to an air bag that prevents occupants from colliding with a structure such as a crash pad or a center fascia and prevents damage of a passenger's neck or brain due to rotation of the head when oblique collision of vehicles occurs.

Description of the Related Art

As interest in safety of occupants in addition to functionality and convenience of vehicles increases, importance of safety-related devices that protect occupants in the event of accident also increases. Among safety devices for protecting occupants, in particular, an air bag system is a basic protective system for dispersing impact exerted on occupants in the event of vehicle collision.

In particular, a front air bag is disposed in front of occupants and prevents occupants from directly colliding with various structures within the vehicle and also blocks impact energy transmitted from the outside in the event of vehicle collision. However, conventional air bags have problems in that in the event of oblique collision of vehicles (e.g., side impact), occupants may not be sufficiently protected by the conventional air bags.

The above information disclosed in this section is merely to enhance the understanding of the background of the invention and therefore it must not be taken as an admission that it corresponds to the prior art well known to those who have ordinary skill in the art.

SUMMARY

The present invention provides a front air bag capable of preventing, in the event of oblique collision of vehicles, a passenger head collision directly with a center fascia and the like or potential passenger injury due to impact with a surface of a chamber of the air bag.

A front air bag for a vehicle, according to the present invention for accomplishing the object as above, may include: an air bag cushion having an indoor side chamber, a central chamber, and a door side chamber; a gas flow passage for supplying each of the chambers of the air bag cushion with gas of an inflator; a variable valve disposed between the inflator and the gas flow passage to selectively close and open the gas flow passage; and a controller configured to determine a situation of vehicle collision via an impact sensor and operate the variable valve.

The front air bag may further include a first vent aperture that provides fluid communication between the indoor side chamber and the central chamber and a second vent aperture that provides fluid communication between the central chamber and the door side chamber. The controller may be configured to operate the variable valve to deploy the central chamber and the indoor side chamber when an oblique collision is detected. The controller may further be configured to operate the variable valve to deploy the central chamber and the door side chamber in response to detecting a front collision.

The first and second vent apertures may be active vent apertures and the controller may be configured to operate the first vent aperture to be closed and the second vent aperture to be opened in response to detecting an oblique collision. Additionally, the first and second vent apertures may be active vent apertures and the controller may be configured to operate the first and second vent apertures to be opened in response to detecting a front collision. The door side chamber may further comprise a third vent aperture that provides the chamber to communicate fluidly with the exterior. The gas flow passage connected to the indoor side chamber may be formed to have a diameter greater than the diameters of the other gas flow passages.

In accordance with another aspect of the present invention, the present invention provides a method of controlling a front air bag for a vehicle that may include: identifying whether occupants enter the vehicle; detecting collision signals for determining a situation of vehicle collision; selecting one or more chambers to be deployed in response to the signals detected collision signals; and operating a variable valve to deploy the selected chambers.

With the front air bag for a vehicle according to the present invention as described above, it may be possible to allow only the indoor side and central chambers to be deployed in the event of an oblique collision of the vehicle and thus, a direct occupant collision with a structure of the vehicle such as a center fascia and the like may be prevented. Additionally, it may be possible to maintain pressure in the indoor side chamber high to thus prevent potential injury to a passenger's neck and brain. Further, it may be possible to allow chambers of the air bag to be selectively deployed based on the situation of front collision or oblique collision of the vehicle, and thus, even when increasing volume of chambers of the air bag, capacity of an inflator does not need to be increased.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings, however, it is not limited to the exemplary embodiment of the present invention. Further, in the description of the present invention, the detailed description of related well-known configurations and functions is not provided, when it is determined as unnecessarily making the scope of the present invention unclear.

Figure 1:
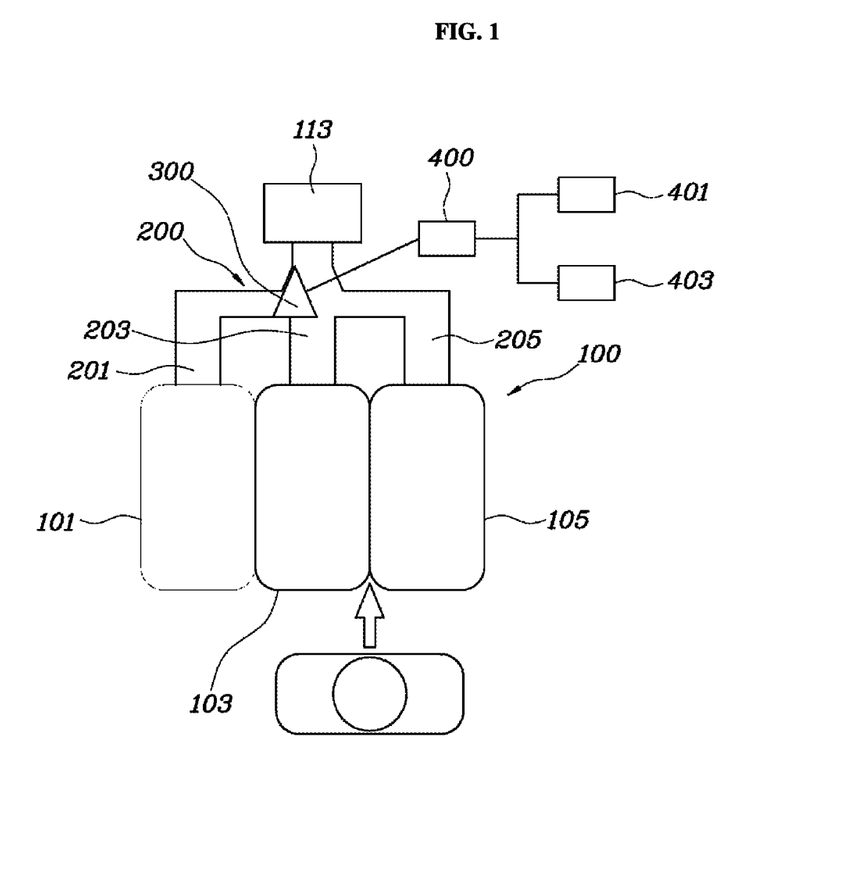
FIG. 1 is a diagram showing an operating state of a front air bag for a vehicle according to an exemplary embodiment of the present invention in the event of front collision.
Figure 2:
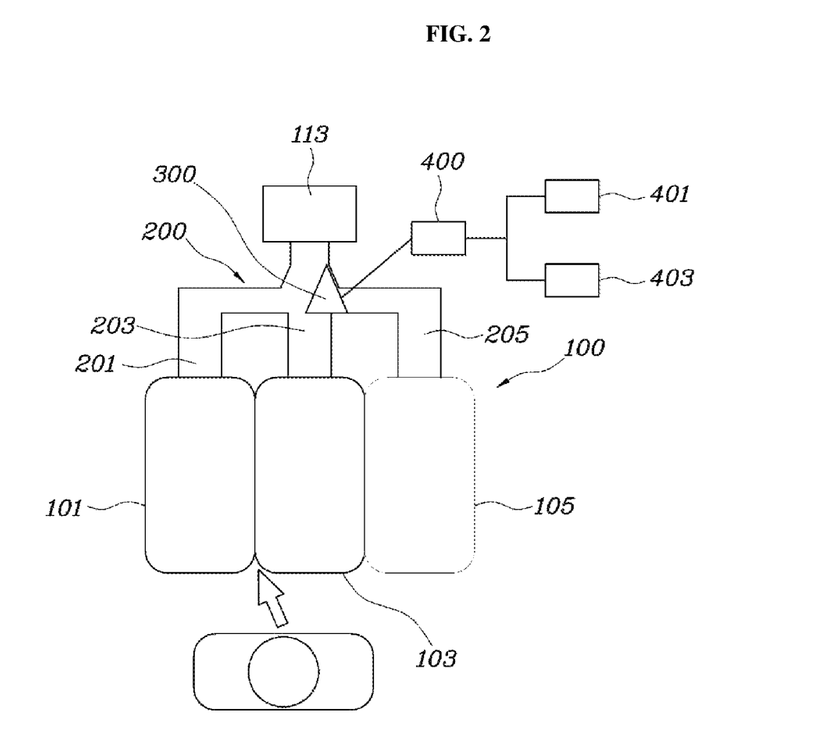
FIG. 2 is a diagram showing an operating state of a front air bag for a vehicle according to an exemplary embodiment of the present invention in the event of oblique collision.
Figure 3:
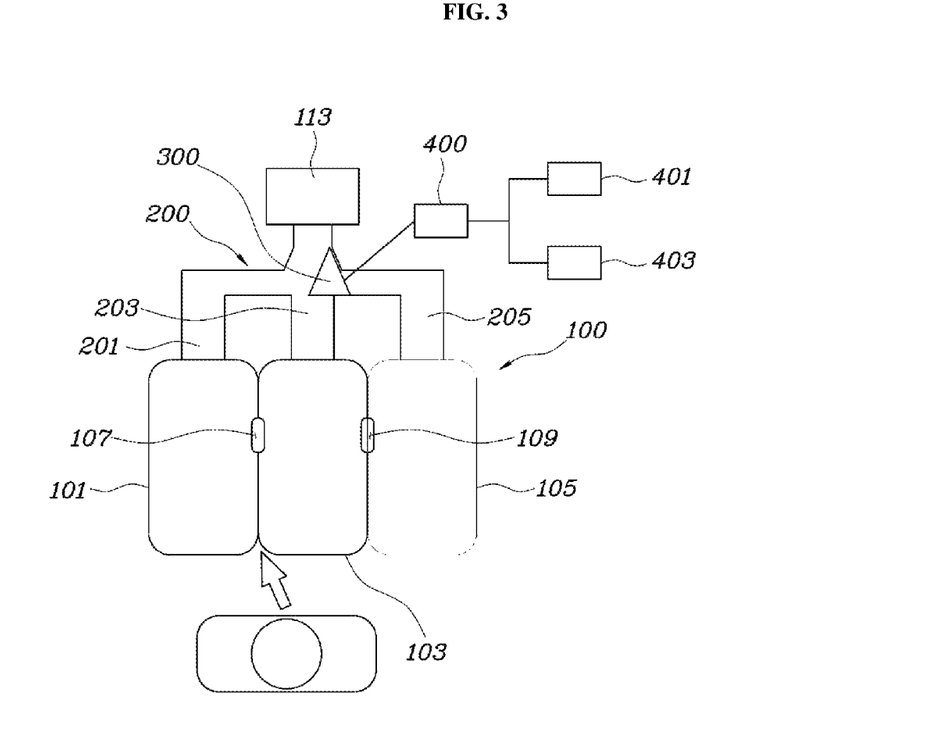
FIG. 3 is a diagram showing an operating state of vent apertures of a front air bag for a vehicle according to an exemplary embodiment of the present invention in the event of front collision.
Figure 4:
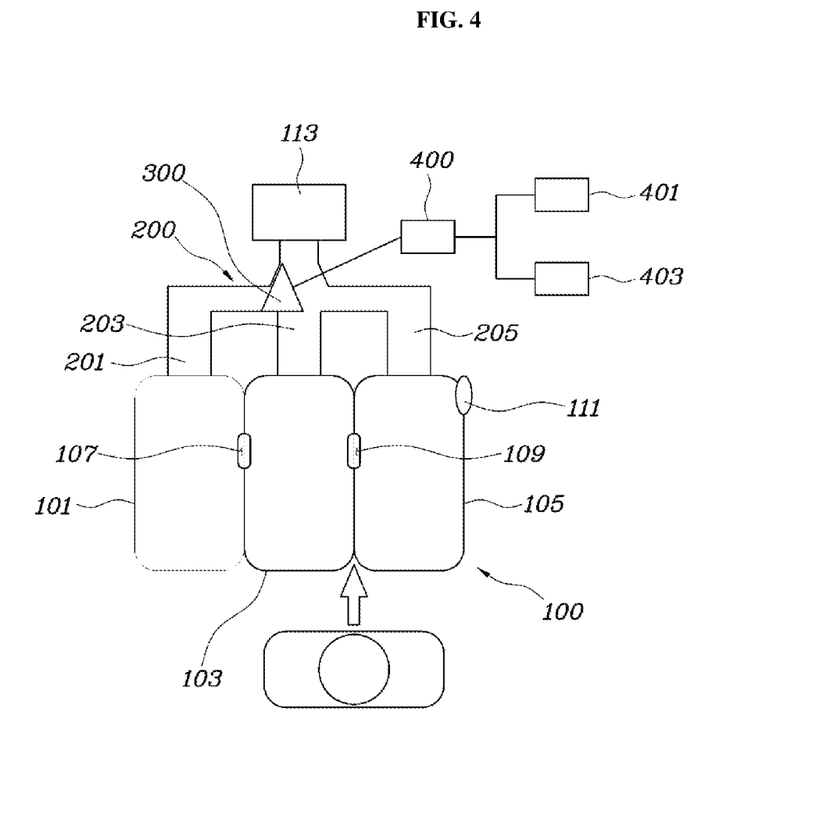
FIG. 4 is a diagram showing an operating state of vent apertures of a front air bag for a vehicle according to an exemplary embodiment of the present invention in the event of oblique collision.
Figure 5:
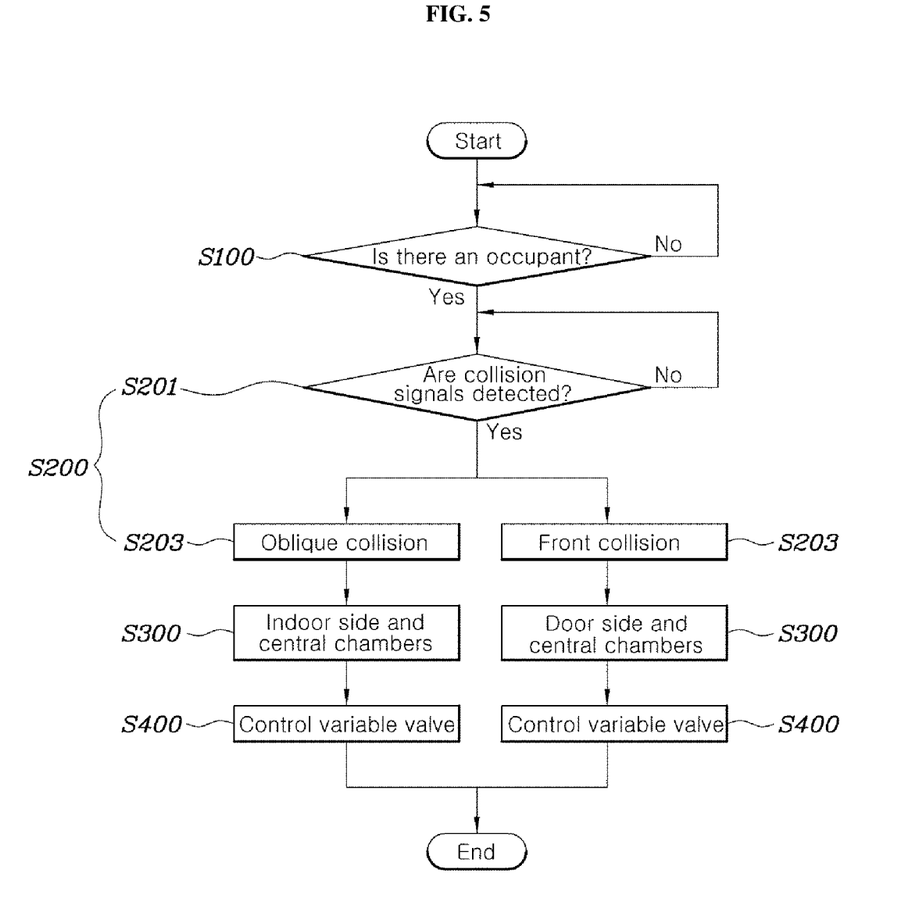
FIG. 5 is a flowchart of a method of controlling a variable valve of a front air bag for a vehicle according to an exemplary embodiment of the present invention.

FIG. 1 is a diagram showing an operating state of a front air bag for a vehicle according to an exemplary embodiment of the present invention in the event of front collision; FIG. 2 is a diagram showing an operating state of a front air bag for a vehicle according to an exemplary embodiment of the present invention in the event of oblique collision; FIG. 3 is a diagram showing an operating state of vent apertures of a front air bag for a vehicle according to an exemplary embodiment of the present invention in the event of front collision; FIG. 4 is a diagram showing an operating state of vent apertures of a front air bag for a vehicle according to an exemplary embodiment of the present invention in the event of oblique collision; and FIG. 5 is a flowchart of a method of controlling a variable valve of a front air bag for a vehicle according to an exemplary embodiment of the present invention.

A front air bag for a vehicle, according to the present invention for accomplishing the object as above, may include: an air bag cushion 100 having an indoor side chamber 101, a central chamber 103, and a door side chamber 105; a gas flow passage 200 for supplying each of the chambers of the air bag cushion 100 with gas of an inflator 113; a variable valve 300 disposed between the inflator 113 and the gas flow passage 200 to selectively close and open the gas flow passage 200; and a controller 400 configured to determine a situation of vehicle collision (e.g., categorize the type of collision) using an impact sensor 401 and operate the variable valve 300.

Particularly, the controller 400 may be configured to operate the variable valve 300 to deploy the central chamber 103 and the indoor side chamber 101 in response to detecting an oblique collision. The controller 400 may further be configured to operate the variable valve 300 to deploy the central chamber 103 and the door side chamber 105 in response to detecting a front collision.

In general, a front air bag for a vehicle is mounted inside a steering wheel of the vehicle or a crash pad. The air bag prevents occupants from colliding directly with various structures of a vehicle body by being deployed rapidly when a vehicle collision is detected using various signal values obtained from an impact sensor 401, or an electronic control unit (ECU) 403, etc. of the vehicle, and also absorbs impact force transmitted from the outside and therefore prevents the impact force from being transmitted to the occupants. In conventional vehicles, when a vehicle collision occurs, the driver has been protected by a conventional curtain air bag and a front air bag. However, in the event of an oblique collision, as opposed to a front or lateral collision, protection of the occupant is insufficient due to an unexpected movement behavior of the occupant.

Specifically, referring to the situation of an oblique collision by way of example, the head of the occupant would not be loaded onto a central portion of an air bag cushion 100 but onto a lateral side thereof in the event of the oblique collision. Thus, when the air bag cushion 100 is a conventional air bag cushion, the indoor side of such conventional air bag cushion is not capable of supporting the head loaded thereon causing a collapse. Thus, the head slid off the surface of the air bag cushion 100 and then collided directly with the crash pad or the center fascia, thereby causing injury to the head. In addition, the neck or brain of the passenger were potentially injured due to rotation of the head while the head slid off the indoor side surface of the air bag cushion 100.

Accordingly, the size of the air bag cushion 100 is intended to be increased to cover protection area up to the center fascia, and thus, volume of the air bag cushion 100 is increased causing a burden on capacity of an inflator 113 and deployment speed of the air bag is decreased, and thus, protection of the occupant is insufficient. Therefore, the present invention illustrated by way of example in FIGS. 1 to 4 is configured to increase size of the air bag cushion 100 to cover protection area up to the center fascia area and allow each of the chambers of the air bag cushion 100 to be deployed selectively by adjusting gas in the inflator 113 to be supplied selectively to each of the chambers to achieve rapid deployment speed of the air bag without increasing capacity of the inflator 113, with the result that occupants may be protected sufficiently in the event of an oblique collision.

Specifically, referring to the drawings, the air bag cushion 100 may be divided into an indoor side chamber 101, a central chamber 103, and a door side chamber 105. In particular, each of the chambers may include a single or multiple chambers. Each of the chambers may be connected to a gas flow passage 200 to supply gas in an inflator 113 thereto and a variable valve 300 may be disposed between the inflator 113 and the gas flow passage 200 to open or close the gas flow passage 200 to thus selectively deploy each of the chambers.

In response to detecting a front collision based on information received from an impact sensor 401, or ECU 403, etc., a controller 400 may be configured to operate the variable valve 300 to deploy the central chamber 103 and the door side chamber 105. Further, in response to detecting an oblique collision, the controller 400 may be configured to operate the variable valve 300 to deploy the central chamber 103 and the indoor side chamber 101. Accordingly, it may be possible to reduce volume of chambers to be deployed without increasing capacity of the inflator 113 and effectively cope with front and oblique collisions.

The front air bag may further include a first vent aperture 107 that provides fluid communication between the indoor side chamber 101 and the central chamber 103 and a second vent aperture 109 that provides fluid communication between the central chamber and the door side chamber 105. The first and second vent apertures 107, 109 may be active vent apertures and the controller 400 may be configured to operate the first vent aperture 107 to be closed and the second vent aperture 109 to be opened in response to detecting the oblique collision.

In an oblique collision, although it is important to increase protection area of the air bag cushion 100 to prevent the occupant from directly colliding with the center fascia, as mentioned above, it is also important that the air bag cushion maintains support force under the state that the increased portion is not collapsed. Therefore, according to the present invention, a first vent aperture 107 that provides fluid communication between the indoor side chamber 101 and the central chamber 103 may be closed to maintain gas supplied to the indoor side chamber 101 to secure support force, while a second vent aperture 109 that provides fluid communication between the central chamber and the door side chamber 105 may be opened, and thus, gas may be discharged to the door side chamber 105 through the second vent aperture 109 after the head of the occupant is loaded onto (e.g., makes impact with) the air bag and thus it may be possible to decrease gas pressure. Accordingly, it may be possible to prevent occupants from colliding directly with the center fascia, prevent injury to the brain and neck due to rotation of the head, and mitigate impact exerted on occupants due to deployment pressure of the air bag.

Furthermore, first and second vent apertures 107, 109 may be active vent apertures and the controller 400 may be configured to operate the first and second vent holes 107, 109 to be opened in response to detecting a front collision. In the event of a front collision, the head and upper body of the occupant contacting or making impact with the air bag are less biased and thus, it is advantageous to maintain pressure in the central chamber 103 and the door side chamber 105 equally. In addition, it is also important to discharge gas in the inflator 113 to mitigate impact exerted to the occupant due to deployment pressure of the air bag.

Therefore, according to the present invention, the second vent aperture 109 that provides fluid communication between the central chamber and the door side chamber 105 may be opened to maintain pressure in the central chamber and the door side chamber 105 evenly, while the first vent aperture 107 that provides fluid communication between the indoor side chamber 101 and the central chamber 103 may be opened to allow gas to be discharged to the indoor side chamber 101 when the head and upper body of the occupant are loaded onto the air bag.

The door side chamber may further include a third vent aperture 111 that provides the chamber to communicate fluidly with the outside. Additionally, a general vent aperture that fluidly communicates with the outside may be further provided in the door side chamber 105 to facilitate the discharge of gas in the door side chamber 105. A gas flow passage 201 connected to the indoor side chamber 101 may be formed to have a diameter greater than the diameters of the other gas flow passages 203 and 205.

In the event of an oblique collision, to prevent the head of the occupant from rotating when the head contacts the air bag, support force may be secured by maintaining pressure in the indoor side chamber 101, as mentioned above. Particularly, it may be contemplated to increase the diameter of the gas flow passage connected to the indoor side chamber 101 to charge an increased amount of gas into the chamber to thus increase deployment speed and pressure and protect occupants.

A method of controlling a front air bag for a vehicle may include: identifying whether occupants enters the vehicle (S100); detecting collision signals for determining a situation of vehicle collision (S200); selecting one or more chambers to be deployed in response to the detected signals (S300); and operating a variable valve 300 to deploy the selected chambers (S400).

In the determination of whether occupants enter the vehicle, the method may include determining whether to activate the air bag. Additionally, in the detection of collision signals, the method may include determining whether a vehicle collision occurs and determining a mode of collision (S201 and step S203 respectively), based on information received from the impact sensor 401 or the ECU 403. In the selection of one or more chambers to be deployed, the method may include selecting one or more chambers to be deployed in response to detecting collision signals. Further, in the operation of the variable valve, the variable valve 300 may be operated to deploy the selected chambers. Accordingly, the front air bag for a vehicle may be controlled as mentioned above, it may be possible to effectively cope with both of a front collision and an oblique collision and thereby more securely protecting occupants.

Although the present invention has been described and illustrated in connection with specific exemplary embodiments, it will be apparent to those who have ordinary skill in the art that various modifications and changes to the present invention may be made without departing from the spirit and scope of the present invention as defined in the appended patent claims.

What is claimed is:

1. A front air bag for a vehicle, comprising:
    an air bag cushion including an indoor side chamber, a central chamber, and a door side chamber;
    a gas flow passage for directly supplying each of the chambers of the air bag cushion with gas of an inflator;
    a variable valve disposed between the inflator and the gas flow passage to selectively close and open the gas flow passage; and
    a controller configured to determine a type of vehicle collision using an impact sensor and operate the variable valve according to the vehicle collision type.

2. The front air bag for a vehicle of claim 1, wherein the controller is configured to operate the variable valve to deploy the central chamber and the indoor side chamber in response to detecting an oblique collision.

3. The front air bag for a vehicle of claim 1, wherein the controller is configured to operate the variable valve to deploy the central chamber and the door side chamber in response to detecting a front collision.

4. The front air bag for a vehicle of claim 1, wherein the gas flow passage connected to the indoor side chamber is formed to have a diameter greater than diameters of the other gas flow passages.

5. A method of controlling a front air bag for a vehicle according to claim 1, comprising:
    identifying, by a sensor, whether occupants enter the vehicle;

detecting, by a controller, collision signals for determining a type of vehicle collision;

selecting, by the controller, one or more chambers to be deployed in response to the detected collision signals; and operating, by the controller, a variable valve to deploy the selected chambers.

6. The front air bag for a vehicle of claim 1, further comprising:

a first vent aperture that provides fluid communication between the indoor side chamber and the central chamber; and a second vent aperture that provides fluid communication between the central chamber and the door side chamber.

7. The front air bag for a vehicle of claim 6, wherein the first and second vent apertures are active vent apertures and the controller is configured to operate the first vent aperture to be closed and the second vent aperture to be opened in response to detecting an oblique collision.

8. The front air bag for a vehicle of claim 6, wherein the first and second vent apertures are active vent apertures and the controller is configured to operate the first and second vent apertures to be opened in response to detecting a front collision.

9. The front air bag for a vehicle of claim 8, wherein the door side chamber further comprises:

a third vent aperture that provides the door side chamber to communicate fluidly with the outside.

* * * * *